United States Patent
Kang

[11] Patent Number: 5,986,245
[45] Date of Patent: Nov. 16, 1999

[54] WALL MOUNTED MICROWAVE OVEN AND CONTROL METHOD THEREFOR

[75] Inventor: Jeon Hong Kang, Kyungki-do, Rep. of Korea

[73] Assignee: Samsung Electronics Co., Ltd., Suwon, Rep. of Korea

[21] Appl. No.: 09/266,754

[22] Filed: Mar. 12, 1999

[30] Foreign Application Priority Data

Jul. 27, 1998 [KR]  Rep. of Korea ................. 98-30195

[51] Int. Cl.⁶ ..................... H05B 6/80; H05B 6/68
[52] U.S. Cl. .................. 219/702; 219/718; 219/757; 126/273 A; 126/299 D
[58] Field of Search .................... 219/702, 710, 219/716, 718, 721, 757, 758; 126/21 A, 273 A, 299 R, 299 D

[56] References Cited

U.S. PATENT DOCUMENTS

| | | |
|---|---|---|
| 4,143,646 | 3/1979 | Sampsel .................. 126/299 D |
| 4,198,553 | 4/1980 | Dills ........................... 219/718 |
| 4,221,949 | 9/1980 | Minakawa . | |
| 4,488,026 | 12/1984 | Tanabe . | |
| 4,886,046 | 12/1989 | Welch ....................... 219/757 |

*Primary Examiner*—Philip H. Leung
*Attorney, Agent, or Firm*—Burns, Doane, Swecker & Mathis, L.L.P.

[57] ABSTRACT

Disclosed is a wall mounted microwave oven and a control method therefor including a body forming a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct. The wall mounted microwave oven includes a switch for selecting one out of a low-level voltage and a normal voltage supplied to said magnetron and a controller for controlling the switch in such a manner that the low-level voltage is supplied to the magnetron when the hood fan operates during the magnetron operates with the normal voltage, and simultaneously extending remaining cooking time by a predetermined rate. Accordingly, the wall mounted microwave oven changes the normal voltage supplied to the magnetron into the low-level voltage and extends cooking time, to thereby efficiently cook the food, in the case that the hood fan and the hood electric lamp operates simultaneously.

13 Claims, 4 Drawing Sheets

WALL MOUNTED MICROWAVE OVEN AND CONTROL METHOD THEREFOR

BACKGROUND OF THE INVENTION

1. Field of the Invention

The present invention relates to a wall mounted microwave oven and a control method therefor, and more particularly, to a wall mounted microwave oven comprising a body forming therein a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct

2. Description of the Related Art

As shown in FIG. 1, a wall mounted microwave oven is mounted on a wall above a gas range 50, and has a function of inhaling vapor and fumes generated when food are cooked in the gas range 50, in order for the microwave oven to serve as a hood. As shown in FIGS. 1 and 2, the wall mounted microwave oven is comprised of a body 3 having a cooking cavity 4 in which the food to be cooked are accommodated, and a casing surrounding the body 3. A magnetron 30 which supplies high frequency electromagnetic waves into the cooking cavity 4 is mounted in the body 3. The magnetron 30 receives a high-tension current via a high-voltage transformer (not shown) and a high-voltage capacitor (not shown).

Meanwhile, the casing 6 includes an upper casing 6a surrounding the upper portion and both the side surfaces of the body 3, and a lower casing 6b combined with the lower portion of the body 3. Hood duct 15 as a path for exhausting vapor and fumes is formed in the space between the casing 6 and the body 3. To do so, an inlet port 8 for inhaling vapor and fumes into the hood duct 15 is formed on the lower casing 6b and an outlet port 9 is formed on the upper surface of the upper casing 6a. An exhaust pipe 11 is connected with the outlet port 9. The exhaust pipe 11 is connected with an exhaust path 17 penetrating the wall and communicating with the air. Hood fan 13 is installed in the upper portion of the body 3 in the vicinity of the outlet port 9, in order to exhaust the vapor and fumes inhaled into the hood duct 15 via the inlet port 8 to the air via the outlet port 9. Meanwhile, a hood electric lamp 55 for illuminating the gas range 50 is installed on the bottom of the lower casing 6b.

In the case that the magnetron 30 having a consumption power of above 1 KW and the hood electric lamp 55 having a consumption power of 80 W, or the magnetron 30 having a consumption power of above 1 KW and the hood fan 13 having a consumption power of 150 W–200 W operate simultaneously, the microwave oven may be overloaded, a fuse in a distribution panel may be melted and thus electric power may be cut off.

Accordingly, the wall mounted microwave oven adopts the function capable of supplying the magnetron 30 with a voltage lower than a normal voltage in order to avoid being overload.

When the magnetron 30 operates together with the hood electric lamp 55 or the hood fan 13, electric power to be supplied to the magnetron 30 may be changed from the normal voltage to the low-level voltage. However, since a predetermined cooking time is not changed even in the case that the electric power supplied to the magnetron 30 is changed into the low-level voltage, the cooking cannot be appropriately performed.

SUMMARY OF THE INVENTION

To solve the above problems, it is an object of the present invention to provide a wall mounted microwave oven which can alter a voltage level to be supplied to a magnetron to prevent the microwave oven from being overloaded, and at the same time alter the cooking time so that the cooking can be properly performed in the case that a voltage level supplied to the magnetron is changed, according to whether a hood fan and so on operates or not, and a control method therefor.

To accomplish the above object of the present invention, there is provided a wall mounted microwave oven comprising a body forming a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct. Said wall mounted microwave oven includes: a switch for selecting one out of a normal voltage and a low-level voltage to be supplied to said magnetron; and a controller for controlling the switch in such a manner that the low-level voltage is supplied to the magnetron when the hood fan operates during the magnetron operates with the normal voltage, and simultaneously extending remaining cooking time by a predetermined rate.

Preferably, said controller controls the switch in such a manner that the low-level voltage is supplied to the magnetron in the case that the magnetron is shall be energized during the operation of the hood fan, and simultaneously sets cooking time longer than that in the normal voltage.

Also, said controller controls the switch in such a manner that the normal voltage is supplied to the magnetron when the hood fan stops during the time when the magnetron operates at the low-level voltage, and shortens remaining cooking time by a predetermined rate.

Said wall mounted microwave oven further comprises a hood electric lamp installed on the bottom of the casing, wherein the controller controls the switch so that the low-level voltage can be supplied to the magnetron when the hood lamp is turned on, and simultaneously remaining cooking time can be extended by a predetermined rate.

It is also preferable that said controller controls the switch so that the normal voltage can be supplied to the magnetron when the hood electric lamp is turned on, and remaining cooking time can be shortened by a predetermined rate, when the hood electric lamp is turned out during the magnetron operates at the low-level voltage.

The object of the present invention can be accomplished by a control method for a wall mounted microwave oven comprising a body forming a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct. Said control method is comprised of the steps of: supplying a normal voltage to the magnetron and setting cooking time in correspondence to the normal voltage; and supplying a low-level voltage lower than the normal voltage to the magnetron and simultaneously extending remaining cooking time by a predetermined rate, if the hood fan operates during operating of the magnetron.

Preferably, said controller controls the switch in such a manner that the low-level voltage is supplied to the magnetron in the case that magnetron shall be energized during the operation of the hood fan, and simultaneously sets cooking time longer than that in the normal voltage.

The normal voltage is supplied to the magnetron when the hood fan stops during the magnetron operates at the low-level voltage, and simultaneously remaining cooking time can be shortened by a predetermined rate.

The microwave oven further comprises a hood electric lamp installed on the bottom of the casing, and wherein the electric power to be supplied to the magnetron is changed from the normal voltage to the low-level voltage when the hood lamp is turned on, and simultaneously remaining cooking time can be extended by a predetermined rate.

The electric power to be supplied to the magnetron is changed from the low-level voltage to the normal voltage and simultaneously remaining cooking time can be extended by a predetermined rate, when the hood electric lamp is turned out during the magnetron operates at the low-level voltage.

Said control method further comprises the steps of: confirming whether the hood fan operates or not; and supplying the normal voltage to the magnetron if the hood fan is deenergized and setting cooking time in correspondence to the normal voltage and supplying the low-level voltage to the magnetron if the hood fan is energized and simultaneously setting a low-level voltage cooking time longer than the normal voltage cooking time.

Preferably, the low-level voltage is supplied to the magnetron in the case that the hood fan is energized during the normal operation of the magnetron, and simultaneously remaining cooking time is extended by a predetermined rate.

Desirably, the normal voltage is supplied to the magnetron when the hood fan is deenergized during the time when the magnetron operates at the low-level voltage, and simultaneously remaining cooking time can be shortened by a predetermined rate.

BRIEF DESCRIPTION OF THE DRAWINGS

The above object and advantages of the present invention will be apparent by describing the structure and operation thereof in detail with reference to the attached drawings in which.

DETAILED DESCRIPTION OF THE INVENTION

Preferred embodiments of the present invention will be described in detail with reference to the accompanying drawings.

Figure 1:
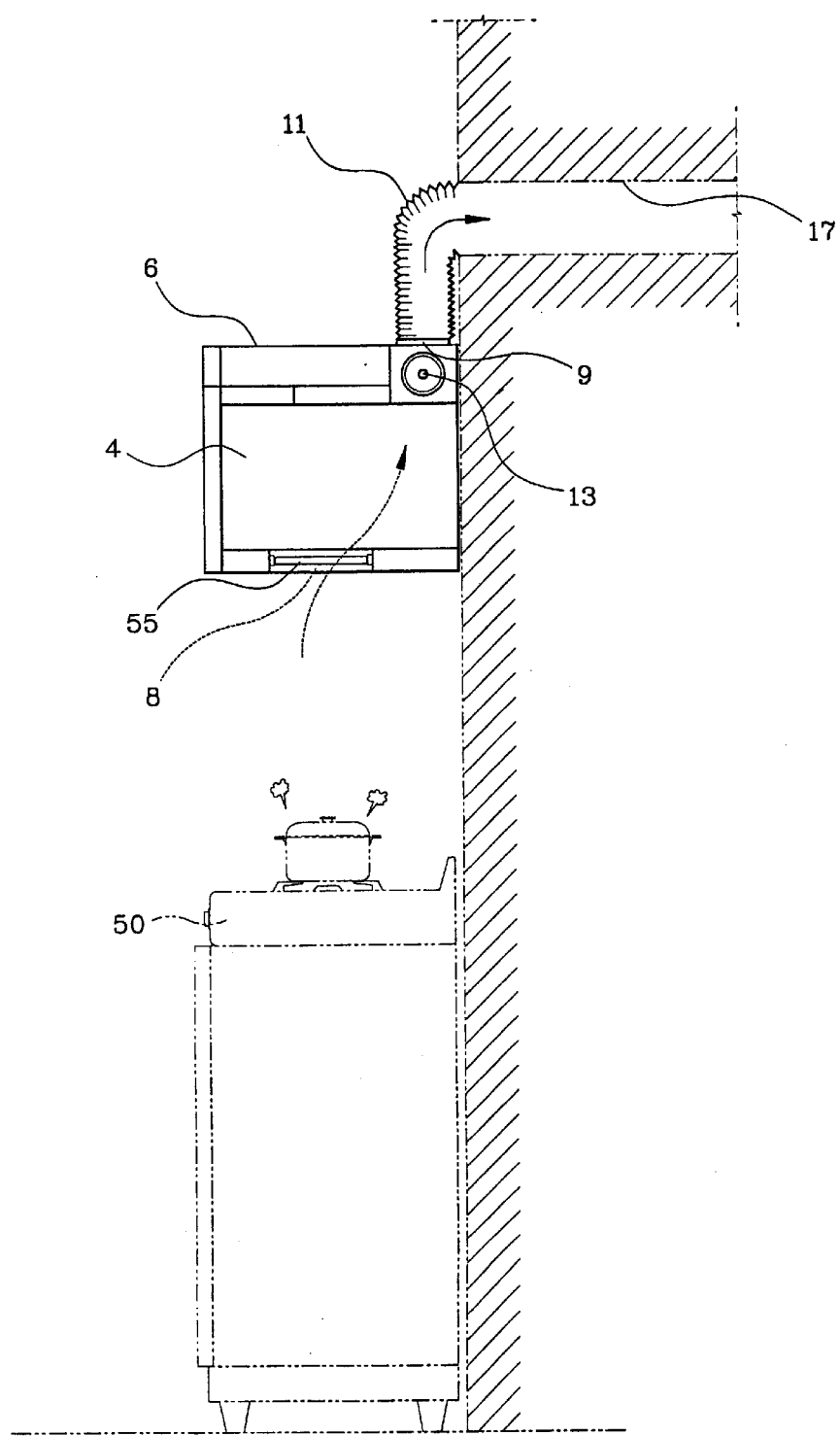
FIG. 1 is a schematic view showing a configuration of a wall mounted microwave oven according to the present invention when it has been installed on a wall.
Figure 2:
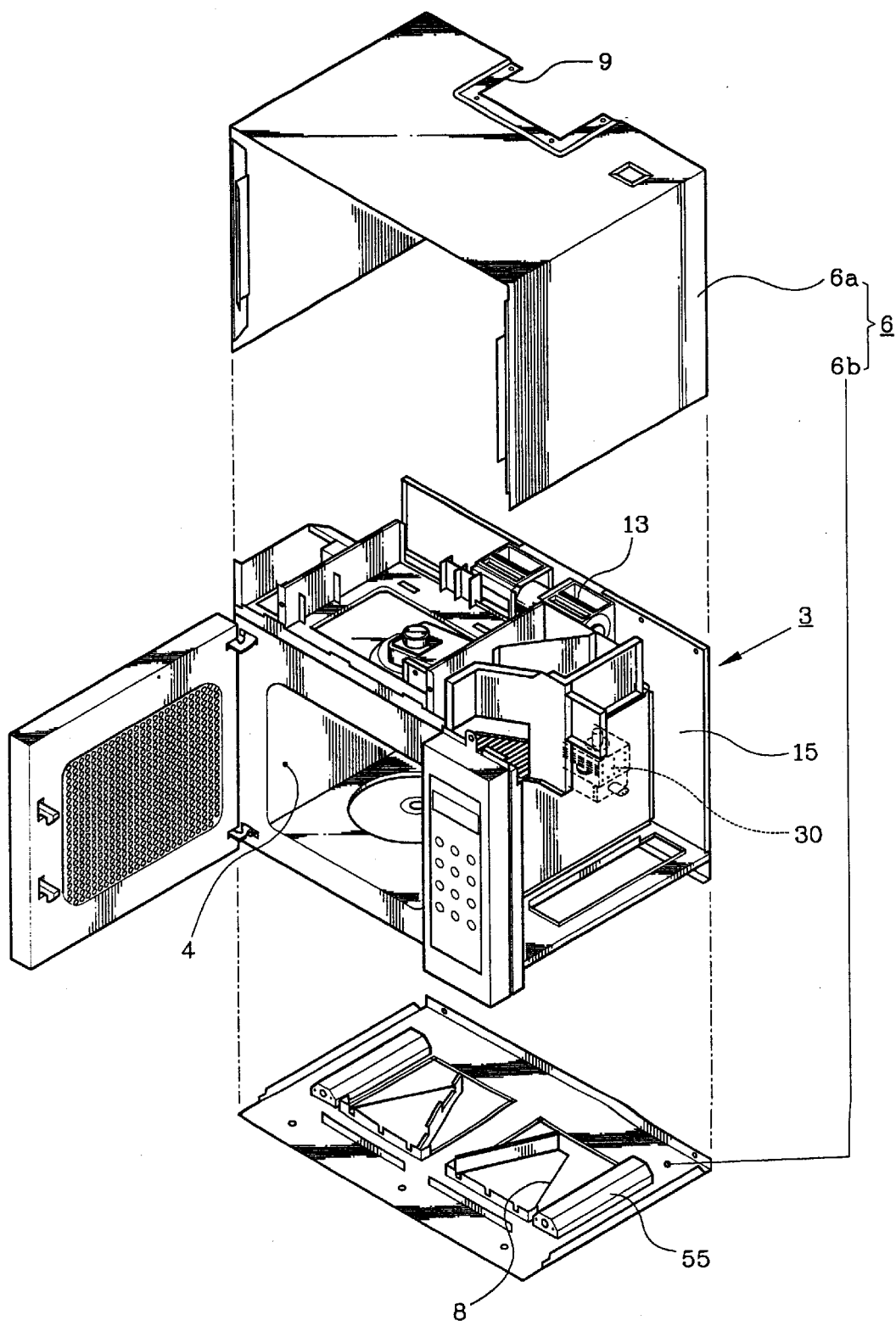
FIG. 2 is a partially exploded perspective view showing a wall mounted microwave oven according to the present invention.

A wall mounted microwave oven according to the present invention has the substantially same configuration as that shown in FIGS. 1 and 2, the detailed description of the structure of the present invention will be omitted herein.

Figure 3:
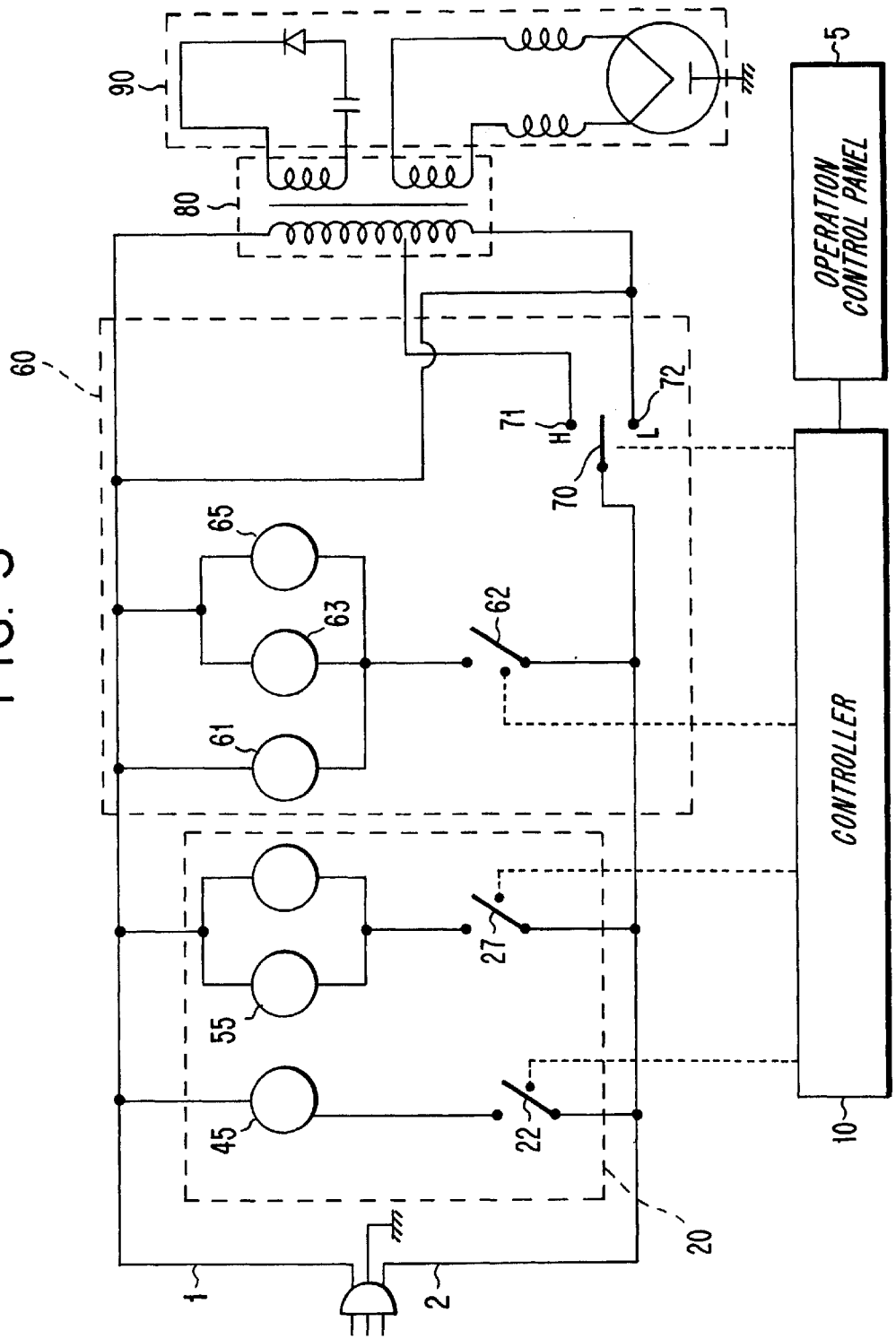
FIG. 3 is a driving circuit diagram of a wall mounted microwave oven according to the present invention.

FIG. 3 is a driving circuit diagram of a wall mounted microwave oven according to the present invention. As illustrated, a driving circuit for a wall mounted microwave oven is comprised of a hood driving portion 20 coupled between first and second commercial power supply lines 1 and 2, and a microwave oven circuit portion 60 connected in parallel with the hood driving portion 20, for controlling electric power for a magnetron driving circuit portion 90 to be supplied via a high-voltage transformer 80.

The microwave oven circuit portion 60 includes a cooking chamber electric lamp 61 and a cooking chamber switch 62 formed between the first and second commercial power supply lines 1 and 2, and a stirrer motor 63 and an air blowing electric fan motor 65 connected in parallel with each other between the first commercial power supply line 1 and an electric power line which connects the cooking chamber electric lamp 61 and the cooking chamber switch 62. Meanwhile, a switch 70 for selecting the level of voltage to be supplied to the high-voltage transformer 80 for energizing the magnetron 30 is connected between the second commercial power supply line 2 and the induction coil of the high-voltage transformer 80, and is formed of a normal voltage contact 71 which is turned on when high electric power is output, and a low-level voltage contact 72 which is turned on when low electric power is output. Here, the normal voltage contact 71 is connected with an intermediate tap on the induction coil and the low-level voltage contact 72 is connected with one end of the induction coil.

Meanwhile, the hood driving portion 20 includes a hood electric lamp 55 connected between the first and second commercial power supply lines 1 and 2 and a hood electric lamp switch 27 for supplying electric power to the hood lamp 55 or isolating it therefrom. The hood driving portion 20 also includes a hood fan motor 45 connected between the first and second commercial power supply lines 1 and 2, connected in parallel with the hood electric lamp 55 and the hood electric lamp switch 27, and a hood fan switch 22 for supplying electric power to the hood fan motor 45 or isolating it therefrom.

Figure 4:
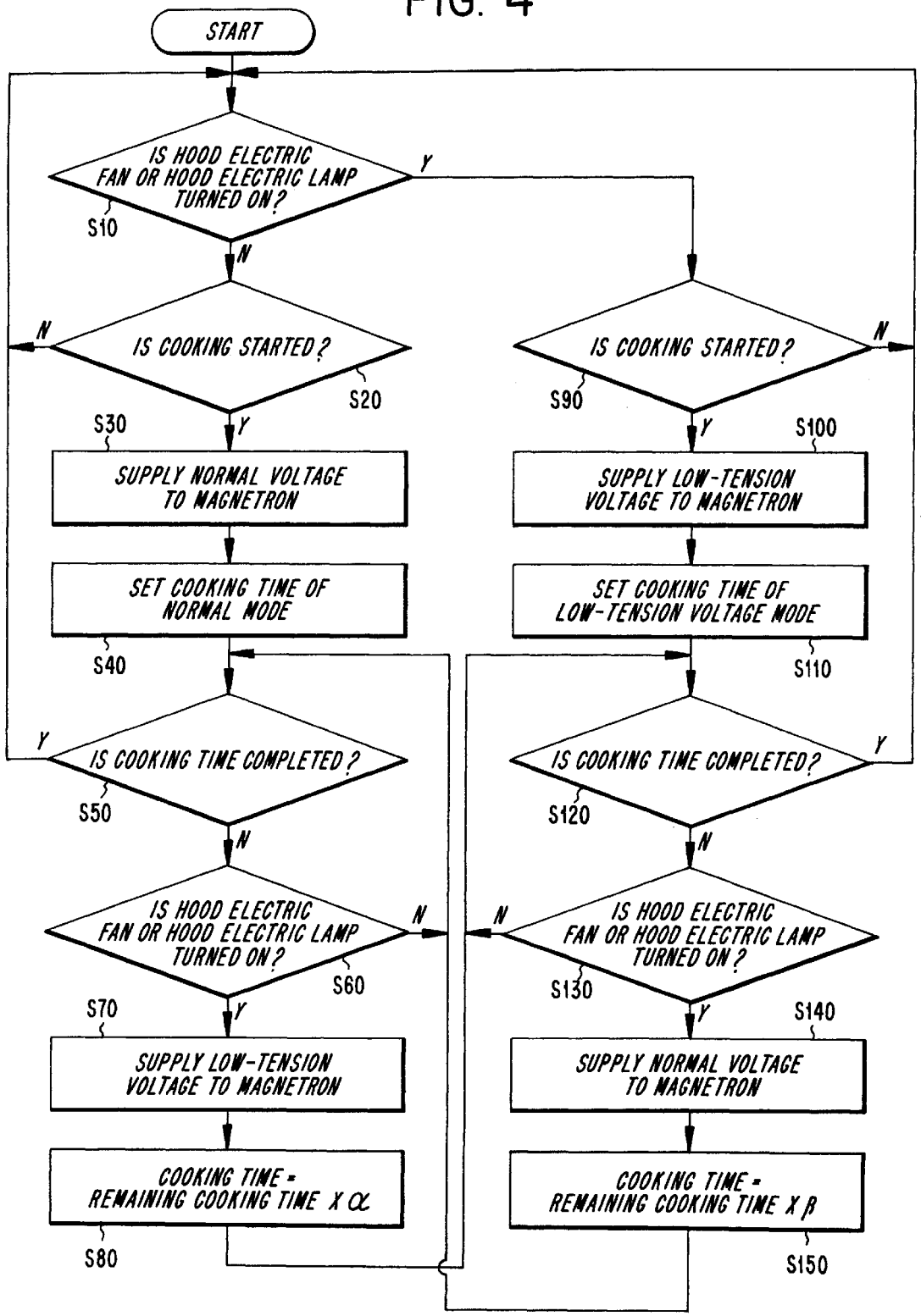
FIG. 4 is a flowchart diagram for explaining a method for controlling the wall mounted microwave oven according to the present invention.

FIG. 4 is a flow chart illustrating a controlling processes of the controller 10. If power is applied to the wall mounted microwave oven, the controller 10 judges whether the hood fan 13 or the hood electric lamp 55 operates or not (S10). If the hood fan 13 or the hood electric lamp 55 does not operate as a result of judgment, the controller 10 judges whether a cooking is started or not (S20). When a cooking is started, the normal voltage contact 71 of the switch 70 is turned on, to supply a normal voltage to the magnetron 30 via the high-voltage transformer 80 (S30). If the normal voltage is supplied to the magnetron 30, the controller 10 sets cooking time of a normal mode in which a normal voltage is supplied to the magnetron 30 (S40).

In this way, if the magnetron 30 operates at a normal mode, the controller 10 judges whether the set cooking time is completed (S50). If the cooking time is completed, the program returns to the step S10 and then judges whether the hood fan 13 or the hood electric lamp 55 operates or not. Meanwhile, if the cooking time remains, the controller 10 judges whether the hood fan 13 or the hood electric lamp 55 has re-started to operate (S60). If the hood fan 13 or the hood electric lamp 55 does not operate, the controller 10 checks whether the cooking time is completed again (S50). If the hood fan 13 or the hood electric lamp 55 operates, the low-level voltage contact 72 of the switch 70 is turned on, to supply the low-level voltage to the magnetron 30 (S70). Then, the controller 10 extends the cooking time up to a predetermined rate by multiplying the remaining cooking time by a constant α being a real number greater than one (S80). Then, the controller 10 checks again whether the cooking time is completed or not (S120).

Meanwhile, if the hood fan 13 or the hood electric lamp 55 operates in the intial step S10, the controller 10 judges whether a cooking is started (S90). If the cooking has been started, the controller 10 supplies the low-level voltage to the magnetron 30 (S100). Then in the same manner as in step S80, the remaining cooking time is extended by a predetermined rate (S110). In the case that it is judged whether the cooking time is completed and that the cooking time is not completed (S120), it is judged whether the hood fan 13 or the hood electric lamp 55 stops or not (S130).

In the case that the hood fan 13 or the hood electric lamp 55 does not stop in the result of judgment in step S130, the controller 10 checks again whether the cooking time has been completed (S120). Also, in the case that the hood fan 13 or the hood electric lamp 55 stops, the normal voltage contact 71 of the switch 70 is turned on, to supply a normal voltage to the magnetron 30 (S140). Then the controller 10 shortens the cooking time by a predetermined rate by multiplying the remaining cooking time by a constant β being a real number less than one (S150). Then, the program returns to step S50, and the controller 10 checks whether the cooking time is completed or not.

As described above, in the present invention, the hood fan 13 or the hood electric lamp 55 operates simultaneously together with the magnetron 30. If a voltage supplied to the magnetron 30 is changed into a low-level voltage lower than the normal voltage, the cooking time is extended by a predetermined rate. Also, in the case that the hood fan 13 or the hood electric lamp 55 stops during the time when the lower-level voltage is supplied to the magnetron 30, the voltage supplied to the magnetron 30 returns to the normal voltage and the cooking time is shortened by a predetermined rate.

That is, the cooking time can be increased or decreased according to the voltage level supplied to the magnetron 30, thereby performing an efficient cooking.

As described above, the wall mounted microwave oven according to the present invention changes the voltage supplied to the magnetron into the low-level voltage and extends cooking time, to thereby efficiently cook food, in the case that the hood fan and the hood electric lamp operate simultaneously.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A wall mounted microwave oven comprising a body forming therein a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct, the wall mounted microwave oven comprising:

a switch for selecting one out of a normal voltage and a low-level voltage to be supplied to said magnetron; and a controller for controlling the switch in such a manner that the low-level voltage is supplied to the magnetron when the hood fan shall operate during the magnetron operates with the normal voltage, and simultaneously extending remaining cooking time by a predetermined rate.

2. The wall mounted microwave oven according to claim 1, wherein said controller controls the switch in such a manner that the low-level voltage is supplied to the magnetron in the case that the magnetron shall be energized during the operation of the hood fan, and simultaneously sets cooking time longer than that in the normal voltage.

3. The wall mounted microwave oven according to claim 2, wherein said controller controls the switch in such a manner that normal voltage is supplied to the magnetron when the hood fan stops during the magnetron operates at the low-level voltage, and shortens remaining cooking time by a predetermined rate.

4. The wall mounted microwave oven according to claim 1, further comprising a hood electric lamp installed on the bottom of the casing, wherein the controller controls the switch so that the low-level voltage can be supplied to the magnetron when the hood electric lamp is turned on, and simultaneously remaining cooking time can be extended by a predetermined rate.

5. The wall mounted microwave oven according to claim 4, wherein said controller controls the switch so that normal voltage can be supplied to the magnetron when the hood electric lamp is turned on, and remaining cooking time can be shortened by a predetermined rate, when the hood electric lamp is turned out during the magnetron operates at the low-level voltage.

6. A control method for controlling a wall mounted microwave oven comprising a body forming therein a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct, the wall mounted microwave oven control method comprising the steps of:

supplying a normal voltage to the magnetron and setting cooking time in correspondence to the normal voltage; and supplying a voltage lower than the normal voltage to the magnetron and simultaneously extending remaining cooking time by a predetermined rate, if the hood fan operates during operating of the magnetron.

7. The control method according to claim 6, wherein the controller controls the switch in such a manner that the low-level voltage is supplied to the magnetron in the case that magnetron shall be energized during the operation of the hood fan, and simultaneously sets cooking time longer than that in the normal voltage.

8. The control method according to claim 7, wherein the normal voltage is supplied to the magnetron when the hood fan stops during the magnetron operates at the low-level voltage, and simultaneously remaining cooking time can be shortened by a predetermined rate.

9. The control method according to claim 6, wherein the microwave oven further comprises a hood electric lamp installed on the bottom of the casing, and wherein the electric power to be supplied to the magnetron is changed from the normal voltage to a low-level voltage when the hood electric lamp is turned on, and simultaneously remaining cooking time can be extended by a predetermined rate.

10. The control method according claim 9, wherein the electric power to be supplied to the magnetron is changed from the low-level voltage to the normal voltage and simultaneously remaining cooking time can be extended by a predetermined rate, when the hood electric lamp is turned out during the time when the magnetron operates at the low-level voltage.

11. A control method for controlling a wall mounted microwave oven comprising a body forming therein a cooking cavity for accommodating food to be cooked, a magnetron for generating electromagnetic waves to be provided into the cooking cavity, a casing surrounding the body and forming therein a hood duct having an inlet port positioned at the bottom portion of the casing and an outlet port positioned in the upper portion thereof, and a hood fan installed in the hood duct, the wall mounted microwave oven control method comprising the steps of:

confirming whether the hood fan operates or not; and supplying a normal voltage to the magnetron if the hood fan is deenergized and setting cooking time in correspondence to the normal voltage and supplying a voltage lower than the normal voltage to the magnetron if the hood fan is energized and simultaneously setting a low-level voltage cooking time longer than the normal voltage cooking time.

12. The control method according to claim 11, wherein the low-level voltage is supplied to the magnetron in the case that the hood fan shall be energized during the normal operation of the magnetron, and simultaneously remaining cooking time is extended by a predetermined rate.

13. The control method according to claim 12, wherein the normal voltage is supplied to the magnetron when the hood fan shall be deenergized during the magnetron operates at the low-level voltage, and simultaneously remaining cooking time can be shortened by a predetermined rate.

* * * * *